(12) United States Patent
Wallstedt et al.

(10) Patent No.: US 6,301,478 B1
(45) Date of Patent: Oct. 9, 2001

(54) INTRA CELL HANDOVER AND CHANNEL ALLOCATION TO REDUCE INTERFERENCE

(75) Inventors: Yngve Kenneth Wallstedt, Solna;
Knut Magnus Almgren, Sollentuna;
Claes Hakan Andersson, Ekero, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/061,228

(22) Filed: May 17, 1993

(51) Int. Cl.$^7$ .................................................. H04B 7/00
(52) U.S. Cl. .............................................. 455/436; 455/63
(58) Field of Search ................................ 455/33.1, 33.2, 455/33.4, 34.1, 34.2, 54.1, 62, 63, 56.1, 436, 437, 438, 440, 442, 444; 379/59, 60

(56) References Cited

U.S. PATENT DOCUMENTS

| | | | |
|---|---|---|---|
| 3,663,762 | 5/1972 | Joel, Jr. | 179/41 A |
| 4,485,486 | 11/1984 | Webb et al. | 455/33 |
| 4,556,760 | 12/1985 | Goldman | 179/2 EB |
| 4,696,027 | 9/1987 | Bonta | 379/60 |
| 4,726,050 | 2/1988 | Menich et al. | 379/60 |
| 4,759,051 | 7/1988 | Han | 379/59 |
| 4,926,421 | 5/1990 | Kawano et al. | 370/95.1 |
| 4,932,049 | 6/1990 | Lee | 379/60 |
| 5,038,399 | 8/1991 | Bruckert | 455/33 |
| 5,067,147 | 11/1991 | Lee | 379/60 |
| 5,067,171 | 11/1991 | Kawano | 455/33 |
| 5,081,671 | 1/1992 | Raith et al. | 379/60 |
| 5,093,924 * | 3/1992 | Toshiyuki et al. | 455/62 |
| 5,175,867 | 12/1992 | Wejke et al. | 455/33.1 |
| 5,193,109 | 3/1993 | Lee | 379/60 |
| 5,239,676 * | 8/1993 | Strawczynski et al. | 455/33.2 |
| 5,278,991 * | 1/1994 | Ramsdale et al. | 455/54.1 |

FOREIGN PATENT DOCUMENTS

| | | | | |
|---|---|---|---|---|
| 404111629 | * | 4/1992 | (JP) | 455/33.1 |
| 405-110.510 | * | 4/1993 | (JP) | 455/33.2 |
| WO 92/12602 | * | 7/1992 | (WO) | 379/60 |

OTHER PUBLICATIONS

Steele, "The Cellular Environment of Lightweight Handheld Portables," *IEEE Communications Magazine*, vol. 27, No. 7, Jul. 1989.

Whitehead, "Cellular System Design: An Emerging Engineering Discipline," *IEEE Communications Magazine*, vol. 24, No. 2, Feb. 1986.

M. Almgren, H. Andersson and K. Wallstedt, "Capacity enhancements in a TDMA system," *Proc. 43rd Vehicular Tech. Conf.*, Apr. 2, 1993.

F. Loise and A. Wejke, "Propagation Measurements for Microcells in Central Stockholm," *Proc. '90*, Orlando, Florida, May 6–9, 1989, pp. 539–541.

J–E Berg, R. Bownds and F. Lotse, "Path Loss and Fading Models for Microcells at 900 Mhz," *Proc 42nd IEEE Vehicular Tech. Conf.*, May 1992, pp. 666–671.

P. Harley, "Short Distance Attenuation Measurements at 900 MHz and 1.8 GHz Using Low Antenna Heights for Microcells," *IEEE JSAX*, vol. 7, No. I, Jan. 1989, pp. 482–486.

(List continued on next page.)

Primary Examiner—Thanh Cong Le
(74) Attorney, Agent, or Firm—Burns, Doane, Swecker & Mathis, L.L.P.

(57) ABSTRACT

A method of reducing interference in a cellular radio communication including performing a courtesy handover of a first call to another channel to reduce interference in a second call when the presence of the first call on the same frequency as the second call causes the interference in the second call. Also, a method of setting up a call which permits a retry to a macro cell when a channel of sufficient quality is not found in a micro cell.

12 Claims, 2 Drawing Sheets

OTHER PUBLICATIONS

H. Andersson, H. Eriksson, A. Fallgren and M. Madfors, "Adaptive Channel Allocation in a TIA IS–54 System," *Proc. 42nd IEEE Vehicular Tech. Conf.*, Apr. 1992, pp. 773–781.

O. Grimlund, J–E Berg, B. Gudmundson, "Handover Performance in Microcellular Systems," *Proc. MRC 91*, Nice, France, Nov. 13–15, 1991, pp. 126–136.

* cited by examiner

INTRA CELL HANDOVER AND CHANNEL ALLOCATION TO REDUCE INTERFERENCE

BACKGROUND OF THE INVENTION

1) Field of the Invention

The present invention relates to a method for intra cell handover and channel allocation in cellular phone systems, and specifically to a method for reducing interference with other users by handoff of a call causing interference.

2) Discussion of Related Art

In cellular telephone systems, a radio link, i.e., a call, between a mobile station and a base station may be switched to a different channel when prevailing reception conditions make this handoff procedure advantageous. The main handover strategies existing in cellular networks are handover between two different cells, i.e., inter cell handover, and handover within a cell, i.e., intra cell handover. Inter cell handover is made when the path loss between a mobile station (MS) and a neighboring base station (BS) is less than the path loss to the base station it is presently in communication with. Intra cell handover is made when a carrier to interference ratio (C/I) is below a certain limit at the same time the path loss in the cell that the mobile is in communication with is less than another limit. These rules can be expressed as:

| Inter cell handover: | Path loss between MS and a neighboring BS < Path loss between MS and own MS - hysteresis. |
|---|---|
| Intra cell handover: | C/I in uplink or C/I in downlink < C/I limit AND Path loss < path loss limit. |

The hysteresis in inter cell handover is needed to avoid repeated handovers at cell borders.

In the TDMA system based on the standard EIA/TIA—IS-54, power is transmitted on all time slots on a carrier in the downlink if at least one time slot is in use. However, the C/I ratio is only checked in the time slot that is currently in use.

In this system, a problem has arisen as follows. The quality, or C/I ratio, in a link depends on both the signal strength C and the interference level I. Both are equally important. When the call suffers from poor quality, a handover should be made in order to find a better channel. A handover order is sent from the base station BS to the mobile station MS and the mobile station MS has to receive the order before it can tune to a new channel. The problem is that the reason for the handover attempt may have been poor quality in the downlink, and thereby the handover order may not be received by the mobile station MS. The call will be lost if the interference in the downlink does not decrease.

The goal for intra cell handover is to find a channel which suffers from less interference in order to improve the C/I ratio. The reason for high interference in the uplink is that some other call is currently using the same channel. The other call may be on the same channel causing interference because it is in communication with a neighboring cell on the same channel or because of misalignment of the time slot due to propagation delay, for example. In the downlink, interference is caused by at least one other call linked to a different cell currently using the same carrier. Even though the quality may be high in both links for a call, the call may severely interfere with another call in the downlink. It is equally important for a user not to interfere with another user as it is for the user not to be subject to interference, but the former cannot be avoided in current intra cell handover criteria.

SUMMARY OF THE INVENTION

The above problems are eliminated or ameliorated by the present invention. When a call is interfering with another call, the present invention has the call causing the interference change channel, rather than requiring the call being subjected to the interference to change channel. This is because the risk of not receiving a handover command is less if the link is not subject to interference. The call being interfered with can be either in communication with a neighboring base station (with the interference being caused by cellular coverage overlap), or in communication with the same base station as the interfering call (with interference being caused by, e.g., propagation delay).

In the existing intra cell handover procedure, only the C/I ratio is checked and then only in the time slot it is allotted. The C/I ratio is checked in the mobile station MS and in the base station BS. However, a call may cause interference on one time slot in the uplink and three time slots in the downlink because the MS only transmits the carrier in its time slot, whereas the BS transmits the carrier in all three when one or more time slots are being used, when the system operates in accordance with IS-54. The latter three time slots are to be checked by the base station BS as well.

The present invention modifies the intra cell handover procedure by introducing a courtesy handover (CHO). If a call in any one time slot in the uplink is interfered with, then it is determined that another call is being interfered with, and the frequency is to be cleared by means of an intra cell handover. The total intra cell handover strategy is outlined below where the last criteria is the courtesy handover.

| Intra cell handover: | (C/I in uplink or C/I in downlink < C/I limit AND Path loss < path loss limit) OR (Interference at most interfered time slot > Interferenee limit). |
|---|---|

The interference limit is a threshold parameter. When a new channel is allocated during call set up, inter cell handover or intra cell handover, the same check is performed. This is especially important when a new carrier is allocated because introduction of a new carrier has the potential of creating a lot of interference.

As meant herein, interference of a call in any time slot includes interference in its own time slot. It is important to clear the frequency when a call is interfering with another call which is also in the same time slot and linked to a different BS.

BRIEF DESCRIPTION OF THE DRAWINGS

The invention will now be described with reference to the drawing figures in which.

DETAIL DESCRIPTION OF PREFERRED EMBODIMENTS

The mobile subscriber density is foreseen to increase, especially in crowded city areas. There are different methods to handle this increase and one of the most powerful is to increase the number of base stations (BSs), thus reducing the cell area for each. Downtown areas could be covered by cells with a radius of about 100–200 meters and with antennas mounted below roof level. These cells are called micro cells and may be introduced in existing TDMA systems in different ways.

One possible scenario could be a traditional cell plan covering a given area. The increasing subscriber density in certain places, for instance in a downtown area of a city, introduces a need for increased capacity in that area. Micro cells are added and a part of the available radio spectrum from the large cells, or macro cells, is given to the micro cells. New handover strategies covering handover between micro cells and macro cells result in a two layer hierarchial cell structure.

The micro cells could be placed close to each other, e.g., in every second street corner, with antennas at lamp post level. This, together with different radio propagation in the micro cells compared to the macro cells, allowing tighter frequency reuse, will give a substantial increase in capacity.

The macro cells in the resulting hierarchical structure are still desirable since they will handle mobile stations (MSs) that move with high speed and also handle traffic in areas where the demand for capacity is low.

However, the introduction of micro cells will cause some difficulties. The radio propagation characteristics for the micro cells differ from the macro cellular characteristics because of houses and other obstacles disturbing the radio path. In particular, the street-corner effect, where the signal strength drops by 15–30 dB within a distance of 10–20 meters, has to be considered.

As a consequence of the smaller cell size, the complexity of frequency and cell planning will increase as well as the number of handovers per call. Thus, Adaptive Channel Allocation (ACA) and reliable handover strategies should be employed. The advantage of utilizing adaptive channel allocation in a cellular system is obvious since frequency planning may be eliminated. This means that additional base stations BSs can easily be installed in order to increase the capacity. Also, fluctuations in the traffic density are handled by adaptive channel allocation since the channels can be used where needed.

Figure 1:
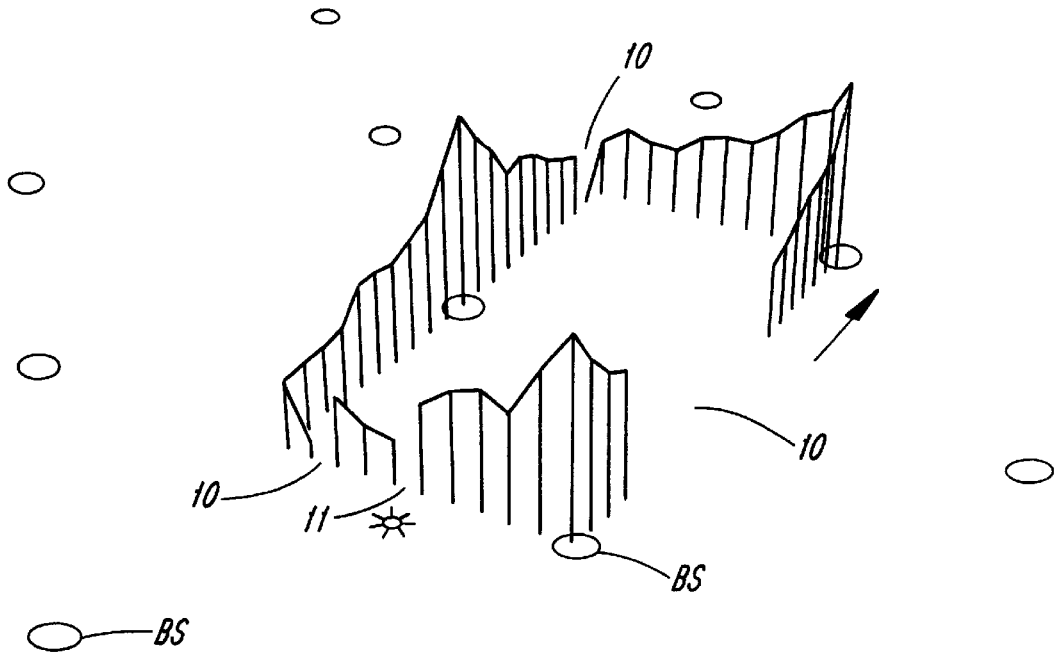
FIG. 1 is a graph of signal strengths for one mobile station MS.

FIG. 1 provides an illustrative example of the signal strength for a single mobile station MS moving in a street micro cell environment. The circles represent base stations BS. Handovers 10 are marked as discontinuities in the line. The mobile station MS makes at least one handover 10 at every second street corner to a new base station BS. Sometimes a base station BS is selected to which the distance between it and the mobile station MS is increasing. However, a new selection is made somewhat later to the base station BS which the mobile station MS is approaching. An example of this can be seen in the handover 11 at the star.

Propagation Model

In street micro cells both the base station BS and mobile station MS antennas are low compared to the height of surrounding buildings. Thus the path loss will strongly depend on the orientation of the streets, along which the radio waves are guided. Along a street with Line-Of-Sight (LOS) to the base station BS, the received signal strength is close to free space propagation, if the distance is less than a few blocks. If the mobile station MS turns around a street corner, there will be a dramatic decrease in signal strength, about 15 to 30 dB over a distance range of 10 to 20 meters.

Sophisticated models can be used to predict the propagation behavior. However, a simple empirical model is sufficient for simulation purposes.

In the model, the path loss basically consists of two parts for a line-of-sight case. One part is the near antenna path loss, which is about the same as for free space. After a breakpoint, a larger path loss is experienced. The distance to the breakpoint is 300 meters and the path loss is thereafter proportional to $d^\alpha$ where d is the distance from the transmitter antenna to the receiver antenna. $\alpha$ equals 5. Hence the path loss model used in simulations:

$$L(d)=20\cdot\log(d)+C_1 \qquad (1)$$

before the breakpoint, and $$L(d)=-30\cdot\log(300)+50\cdot\log(d)+C_1 \qquad (2)$$

after the breakpoint, d>300 m. $C_1$ is a constant.

If there is no line-of-sight path between the mobile station MS and the base station BS the path loss calculation is performed in three steps. First, a street corner that is in line-of-sight to both the mobile station MS and base station BS is identified. Then, the path losses from the base station BS to the street corner and from a fictitious transmitter located in the street corner to the mobile station MS are calculated according to the line-of-sight model above. Finally, the total path loss in dB is the sum of the two line-of-sight terms.

The path loss has been assumed to be, according to equation (3), in the macro cells. $C_2$ is a constant.

$$L(d)=35\cdot\log(d)+C_2 \qquad (3)$$

Lognormal fading has been added to the path losses with a standard deviation of 6 dB for the macro cells and 4 dB for the micro cells.

Street Corners

After a mobile station MS has turned around a street corner, the path loss increases fast at the same time as the mobile station MS may come into line-of-sight of an interferer, i.e., another base station BS, a call of which creates interference with the link of the first mobile station MS. This will cause a drastic reduction of the C/I ratio of the link of the first mobile station MS. In this situation, a quick handover is needed in order to not lose the call. However, previous studies show that a sufficient C/I ratio is needed for the handover to be successful.

New solutions are provided. A first solution is to avoid low C/I ratios close to the border of the coverage area. This is done by a handover from a micro cell to a macro cell as soon as the received signal strength is low when the C/I ratio is below a certain limit.

A second solution is applicable when a mobile station MS turns around a street corner where it will receive low signal strength. If there is a line-of-sight interferer on the new street, the C/I ratio will be quite poor. The mobile station MS may not receive the handover order on the Fast Associated Control Channel (FACCH) due to the low C/I ratio in the downlink.

In order for the communications link with this mobile station MS not to be lost, the interfering base station BS should clear this frequency. Each base station BS checks interference on all time slots on all frequencies (i.e., all channels) where power is transmitted, not only the time slots which are currently in use. A given base station BS using a frequency will thereby detect any mobile station MS that has come into line-of-sight and is using a time slot on that frequency. That mobile station MS may not interfere with a call on the base station BS unless it is using the same time slot, thus making desirable the check of all time slots on a frequency in use.

It is likely, though, that the mobile station MS will be subject to interference in the downlink because the base station BS is transmitting on all time slots if at least one time slot is in use. The base station BS has to clear that frequency by means of intra cell handover, called courtesy handover (CHO) herein. When the interfering base station BS has cleared the frequency, the previous interfered mobile station MS will have a higher C/I ratio and thus a handover command may be successfully received.

There are other ways to ensure the reception of the handover order. One could be to send the order from the target base station BS. However, courtesy handover has some advantages. Courtesy handover can be done at, a base station BS without any explicit communication between neighboring base stations BSs. Furthermore, if the order would be transmitted from another base station BS, excessive interference would be added in the system.

Handover and Call Setup Strategies

The main handover strategy currently in use is mobile assisted handover (MAHO). Three kinds of handover procedures are allowed: between cells on the same layer (inter cell handover), between channels in the same cell (intra cell handover) and between different layers (ascending or descending handovers). Both inter cell and intra cell handover can be done in micro and macro cells. An ascending handover (AHO) is a handover from micro to macro cell and a descending handover (DHO) is a handover from macro to micro cell. Each base station BS has knowledge of the presence of its neighbors on the other hierarchial layer.

The basic handover strategies can be expressed as the following, where Quality_limit, Path_loss_limit and Interference_limit are threshold parameters Min_Quality is the minimum quality in downlink and uplink as measured by the mobile station MS and the base station BS, respectively, and Max_Interference is the maximum interference in all three time slots in the uplink as measured by the base station BS in the preferred embodiment;

| | |
|---|---|
| Intra cell: | (Min_Quality < Quality_limit) |
| | AND |
| | Path loss < Path_loss_limit) |
| | OR |
| | Max_Interference > Interference_limit |
| Inter cell: | Path loss [neighbor(i)] < |
| | (Path loss - Hysteresis) |
| Ascending: | Min_Quality < Quality_limit |
| | AND |
| | Path loss > Path_loss_limit |
| Descending: | Path loss [micro cell(i)] < Path_loss_limit. |

In the last criteria for intra cell handover, if any time slot of the frequency in use is disturbed in the uplink, a courtesy handover is made. Even though a call is not disturbed, it leaves the frequency if its presence on that frequency is disturbing another call. It is a matter of courtesy.

While a system using intra cell handover benefits most from the courtesy handover procedure in the preferred embodiment using micro cells, courtesy handover can involve any of the above handover procedures in any type of cellular radio communications system.

A mobile station MS, connected to a micro cell base station BS, will do an ascending handover instead of an intra cell handover if it currently has a rather high path loss. This is because the mobile station MS is probably close to the border of the micro cell's coverage area and an intra cell handover is only a temporary solution.

Since a mobile station MS should not descend from a macro cell to a micro cell if it is close to the border of the coverage area of the micro cell, the path loss is checked to the target micro cell for descending calls.

The call setup strategy is very simple. A new mobile station MS tries to connect to the micro cell base station BS it receives strongest. If a channel of sufficient quality cannot be found in that base station BS, the mobile station MS tries the strongest macro cell base station BS. If it fails in the macro cell, the mobile station MS is blocked.

Simulated System

The simulated system is compatible with the IS-54 standard. The adaptive channel allocation algorithm utilizes the mobile station measurement reports of the downlink quality on its own channel and is completely decentralized, i.e., the allocation of a channel can be done at the base station BS without any explicit reference to other base stations BSs. Below is listed some of the features of the simulated system:

| | |
|---|---|
| Access method: | TDMA |
| Channels per carrier: | 3 |
| Adjacent channel protection: | 25 dB |
| Transmitted power: | 28 dBm |
| Noise level: | −118 dBm |
| Adaptive Channel Allocation: | Yes |
| Radio link time-out: | 5 seconds |
| No. of micro and macro cells: | 32 and 8 in a wrap around pattern to form a closed surface or globe model |
| No. of channels in micro cells: | 90 ch. <=> 30 frequencies |
| Carried traffic in micro cells: | 283 Erlang/km$^2$ <=> 6.3 Erlang/(cell and MHz) |
| Call time: | exponentially distributed. mean 60 seconds |
| Connected calls: | 3100 |
| Simulated time: | 1000 seconds |
| Turn probability: | 0.3 left and 0.3 right |
| MS speed: | 50% 10 m/s (22 mph). 50% 1 m/s (2.2 mph) |
| Block size: | 100 m, 10 m wide streets |

The adaptive channel allocation was performed in accordance with H. Andersson et al., "Adaptive Channel Allocation in a TIA IS-54 System," *Proc. 42nd IEEE Vehicular Technology Conference,* April 1992, pp. 778–781, herein incorporated by reference.

In the simulated system, a 900 kHz bandwidth was taken from the macro cells for use in micro cells. A micro cell base station BS was placed in every second street corner.

The possibility of losing Slow Associated Control Channel (SACCH) and fast associated control channel (FACCH) messages due to low C/I ratio in a link was included in the simulations, which implies that both measurement reports from the mobile station MS to the base station BS and handover commands from the base station BS to the mobile station MS could be lost in a realistic manner.

Each link was also monitored by use of the Coded Digital Verification Color Code (CDVCC) field. As the Bit Error Rate (BER) on a link increased, it was harder to receive the Digital Verification Color Code (DVCC). If two consecutive DVCCs were not received within 5 seconds, the call is terminated due to radio link time-out.

The CDVCC field was also used at the handover process. Since the mobile stations MSs did not extract the base station BS identity code, the target base station BS had to verify that it is able to take over the call. This was done by letting the target base station BS decode the CDVCC on the old channel.

However, if a mobile station MS is going to do a handover from a micro cell to a macro cell, this procedure may not work. There may be more than one mobile station MS using the same frequency in the micro cell under the target macro cell. Thereby the macro cell may not have a sufficient C/I ratio in order to decode the CDVCC from the mobile station MS that is going to do the handover. This problem was solved by neglecting the verification of a mobile station MS at handover from a micro to a macro cell.

The aim of the simulations was to find out the performance of micro cells in a system with both macro and micro cells and thus the behavior of the macro cells is not addressed. See M. Almgren et al., "Capacity Enhancements in a TDMA System," *Proc. 43rd Vehicular Technology Conference*, 1993, for details on macro cellular performance.

Simulation Results

The radio propagation and the adaptive channel allocation (ACA) allowed a very high traffic with maintained high quality in the micro cells. Each micro cell carried 5.7 Erlang, or 6.3 Erlang/cell/MHz. Thus the micro cells could carry a traffic of 283 Erlang/km$^2$ in only a fraction of the available spectrum.

Figure 2:
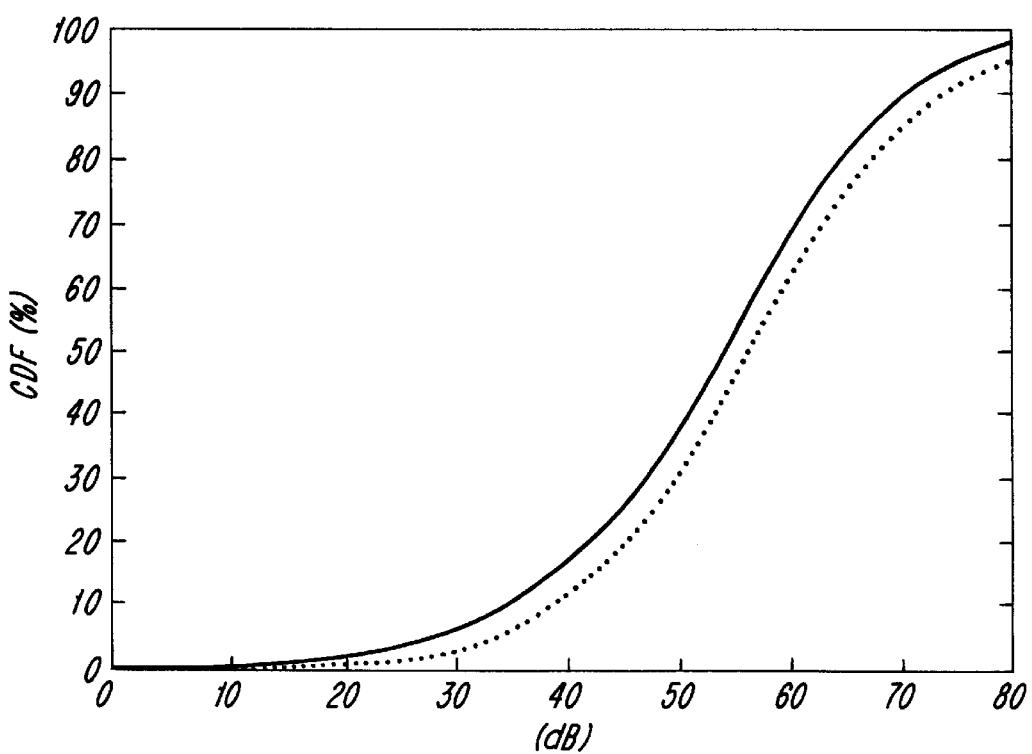
FIG. 2 is a graph of a C/I ratio in micro cells with both ascending handover and courtesy handover wherein the solid line represents the downlink and the dotted line represents an uplink.

The new handover strategies were tried. It was found that both courtesy handover and support from macro cells by ascending handover had great impact on the performance of the micro cells. With both courtesy handover and ascending handover only 0.4% of the calls were lost (see Table I). In the downlink a C/I ratio level above 35 dB was obtained for 90% of the calls (FIG. 2).

TABLE I

Handover strategies' impact on lost calls

| Handover strategy | Lost calls |
|---|---|
| Neither AHO nor CHO | 8.9% |
| With AHO but no CHO | 4.6% |
| No AHO but with CHO | 1.9% |
| With both AHO and CHO | 0.4% |

Figure 3:
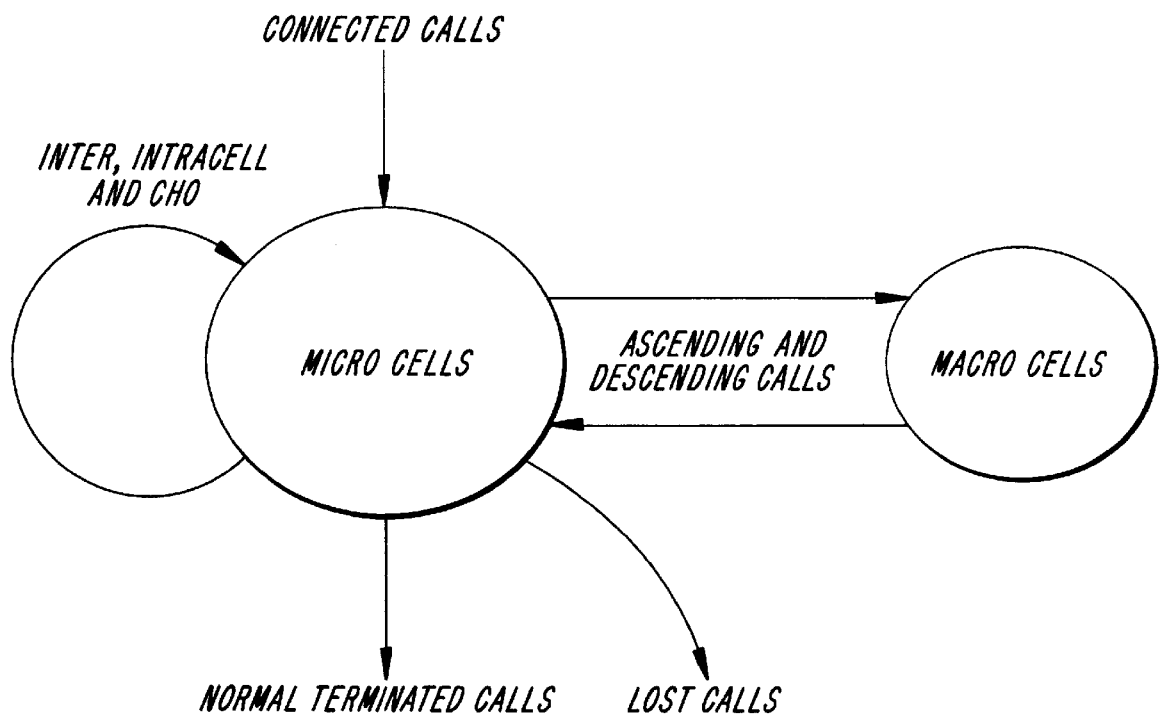
FIG. 3 is a flow model of calls.

Different handover strategies did of course affect the traffic flows defined in FIG. 3. A mobile station MS had to do an inter cell handover at least at every second street corner. As can be seen in Table II, the number of inter cell handovers was the most common handover event. The sum of inter cell handover and ascending handover was substantially constant. Courtesy handover was the most common type of intra cell handover. The macro cells served well as support for the micro cells, only carrying 2.7% of the traffic. All mobile stations MS that made an ascending handover later made a descending handover, thus the traffic did not accumulate in the macro cells.

TABLE II

Handover intensity

| Handover strategy | No. of inter cell handover /call | No. of intra cell including CHO /call | No. of AHO /call |
|---|---|---|---|
| No AHO and no CHO | 1.6 | 0.07 | 0 |
| With AHO but no CHO | 1.4 | 0.04 | 0.4 |
| No AHO but with CHO | 1.8 | 0.9 | 0 |
| With both AHO and CHO | 1.6 | 0.8 | 0.3 |

As a result of the way the simulations were set up, no calls were blocked. The traffic load in the macro cells was very low, with resulting high C/I ratios. A mobile station MS always found a channel of sufficient quality in the strongest macro cell if it could not find an acceptable channel in the micro cell.

The present invention improves the feasibility of using street micro cells in the American Digital Cellular System as given by the TIA standard IS-54. With only a fraction of the available frequency band allocated from macro cells to micro cells, a significant increase in carried traffic is possible without any loss in quality. New handover strategies, e.g., courtesy handover and handovers between the two hierarchial layers, were found to be essential for the performance of the system.

The simulated system performed very well, and it may be possible to achieve even better results in a system with more realistic behavior, such as keeping fast moving mobile stations MSs within the macro cell environment.

The invention described herein includes variations thereof. The described embodiment is to be considered in all respects as illustrative and not restrictive, the scope of the invention being indicated by the appended claims, and all changes within the meaning and range of equivalency of the claim recitations are intended to be embraced therein.

What is claimed is:

1. A method of reducing interference in a radio communication system having more than one mobile station and more than one fixed station, said method comprising:
    determining when a first call is interfering with a second call; and
    handing off the first call to another channel to reduce interference in the second call when it has been determined that the presence of the first call on the same frequency as the second call causes the interference in the second call despite the quality of the first call being of sufficient quality to not warrant hand off.

2. The method of reducing interference in a radio communication system according to claim 1, said determining step includes the further step of:
    checking an interference level on one time slot in the downlink when the radio communication system is a TDMA system.

3. The method of reducing interference in a radio communication system according to claim 1, said method comprising the further steps of:
    determining if any time slot on a frequency in use in the uplink is subject to interference, thereby determining that another call is being interfered with; and
    performing said handing off step by clearing the frequency when it has been determined that another call is being interfered with.

4. The method of reducing interference in a radio communication system according to claim 3, wherein said handing off step involves an intra cell handover.

5. The method of reducing interference in a radio communication system according to claim 3, wherein said handing off step involves an inter cell handover.

6. The method of reducing interference in a radio communication system according to claim 3, said method comprising the further step of:
    carrying out said handing off step when either
        a carrier to interference ratio in an uplink or a carrier to interference ratio in a downlink is less than a carrier to interference ratio limit and a path loss is less than a path loss limit, or
        interference in a most interfered with time slot is greater than an interference limit.

7. The method of reducing interference in a radio communication system according to claim 1, said determining step includes the further step of:
    checking an interference level on all time slots of the same frequency in the uplink when the radio communication system is a TDMA system.

8. A method of reducing interference in a radio TDMA radio communication system having more than one mobile station and more than one fixed base station transmitting information over channels defined by frequency and time slots wherein said more than one base station transmits signals on a predetermined set of associated channels when communicating with a mobile station on a given channel of said set, said method comprising:

provideing a first call link on one channel of an associated set of channels between a first mobile station and a first base station;

providing a second call link on one channel of said associated set of channels between a second mobile station and a second base station;

monitoring interference on at least one channel of said associated set of channels in either said first mobile station or said first base station to determine whether signals transmitted on the associated set of channels which includes the channel carrying the first call link are interfering with the second call link; and handing off the first call link to another set of associated channels to reduce interference in the second call link when it has been determined that said signals transmitted on the associated set of channels which includes the channel carrying the first call link are causing interference in the second call link.

9. The method of reducing interference in a radio communication system according to claim 8, said monitoring step includes the further step of:

checking an interference level on one channel of said associated set of channels in a downlink.

10. The method of reducing interference in a radio communication system according to claim 8, said monitoring step includes the further step of:

checking an interference level on all channels of said associated set of channels in an uplink.

11. The method of reducing interference in a radio communication system according to claim 8, said method comprising the further step of:

carrying out said handing off step when either
a carrier to interference ratio in an uplink or a carrier to interference ratio in a downlink is less than a carrier to interference ratio limit and a path loss is less than a path loss limit, or
interference at a most interfered with channel is greater than an interference limit.

12. The method of reducing interference in a radio communication system according to claim 9, wherein said set of associated channels includes three time slots in a frame transmitted on a predetermined frequency.

* * * * *